US012344425B2

(12) United States Patent
Komatsu et al.

(10) Patent No.: US 12,344,425 B2
(45) Date of Patent: Jul. 1, 2025

(54) DETECTION DEVICE

(71) Applicants: Yakult Honsha Co., Ltd., Tokyo (JP); Shikoku Kakoki Co., Ltd., Tokushima (JP)

(72) Inventors: Kunio Komatsu, Tokyo (JP); Masato Yamada, Itano-gun (JP); Takanori Yabuuchi, Itano-gun (JP)

(73) Assignees: YAKULT HONSHA CO., LTD., Tokyo (JP); SHIKOKU KAKOKI CO., LTD., Itano-gun (JP)

( * ) Notice: Subject to any disclaimer, the term of this patent is extended or adjusted under 35 U.S.C. 154(b) by 72 days.

(21) Appl. No.: 17/795,820

(22) PCT Filed: Jan. 29, 2021

(86) PCT No.: PCT/JP2021/003154
§ 371 (c)(1),
(2) Date: Jul. 27, 2022

(87) PCT Pub. No.: WO2021/153715
PCT Pub. Date: Aug. 5, 2021

(65) Prior Publication Data
US 2023/0072273 A1 Mar. 9, 2023

(30) Foreign Application Priority Data
Jan. 31, 2020 (JP) ................................ 2020-014395

(51) Int. Cl.
*B67B 3/26* (2006.01)
*B65B 7/28* (2006.01)

(52) U.S. Cl.
CPC . *B65B 7/28* (2013.01); *B67B 3/26* (2013.01)

(58) Field of Classification Search
CPC .. B67B 3/26; B67B 3/268; B65B 7/28; B65B 7/285
See application file for complete search history.

(56) References Cited

U.S. PATENT DOCUMENTS 3,743,853 A * 7/1973 Dittman ................ G01V 3/102 336/83
6,104,482 A * 8/2000 Brower ............. G01N 21/9054 356/240.1

(Continued)

FOREIGN PATENT DOCUMENTS

JP S61-127404 A 6/1986
JP H02-140601 A 5/1990

(Continued)

OTHER PUBLICATIONS

International Search Report for International Application No. PCT/JP2021/003154 dated Mar. 9, 2021 (3 sheets).

(Continued)

*Primary Examiner* — Andrew M Tecco
(74) *Attorney, Agent, or Firm* — Kratz, Quintos & Hanson, LLP

(57) ABSTRACT

The purpose of the present invention is to provide a detection device that detects the occurrence of an event (so-called “double capping”) in which two caps are disposed on one container. To that end, the detection device (10, 10A) of the present invention has two types of sensors provided on a production line (100) for a commercial product in which an opening (1A) of a container (1) is sealed with a cap (2), said sensors being a proximity sensor (3) along a path where the container (1) moves and a sensor (4: for example, a transmission sensor) equipped with a transmitter (4A), which is inside the same path, and a receiver (4B). An area detected by the sensors (3, 4) is an area where the cap (2) is not present in a normal state (a state in which double capping has not occurred), but where a subsequent cap (2-1) is present if two caps (2) in a row have been attached to one container (1).

11 Claims, 10 Drawing Sheets

(56) References Cited

U.S. PATENT DOCUMENTS

| | | | | |
|---|---|---|---|---|
| 6,237,418 | B1 * | 5/2001 | Coughlin | B67B 3/26 209/524 |
| 6,473,170 | B2 * | 10/2002 | Schafer | G01N 21/909 356/240.1 |
| 6,654,117 | B1 * | 11/2003 | Reading | B67B 3/264 356/240.1 |
| 11,634,242 | B1 * | 4/2023 | Dibble | B67C 3/2642 53/317 |
| 2010/0115887 | A1 | 5/2010 | Schroeder | |
| 2017/0183116 | A1 * | 6/2017 | Pedercini | B67C 3/007 |
| 2018/0172603 | A1 | 6/2018 | Piana | |
| 2023/0182937 | A1 * | 6/2023 | Dibble | B67C 7/004 53/317 |

FOREIGN PATENT DOCUMENTS

| | | | |
|---|---|---|---|
| JP | H05-180621 | A | 7/1993 |
| JP | H05-270527 | A | 10/1993 |
| JP | H06-40408 | A | 2/1994 |
| JP | H10-236584 | A | 9/1998 |
| JP | 5387171 | B2 | 1/2014 |
| JP | 6283584 | B2 | 2/2018 |

OTHER PUBLICATIONS

Extended European Search Report for European Patent Application No. 21747643.1 dated Apr. 23, 2024 (7 sheets).

* cited by examiner (A)

DETECTION DEVICE

TECHNICAL FIELD

The present invention relates to a detection device which detects an occurring of non-conformity event when a mouth portion of a container is sealed with a cap.

BACKGROUND ART

An opening (a mouth portion) of a container accommodating various types of drink is sealed with a cap (cap made of aluminum, for example) of a material different from the material of the container so as to prevent leakage of the drink which is a content of the container or intrusion of a foreign substance into the container or the drink.

Moreover, in a container for drink, the mouth portion of one container is sealed with a cap, but such a case can occur that, in a process of disposing a cap (capping) on the container mouth portion, a cap disposed on the container mouth portion entrains the subsequent cap, and the two caps are disposed on one container (so-called "double capping" state: as shown in FIGS. 7 and 8).

Since the cap operates a role of a sealing member which prevents inclusion of a foreign substance, if the double-capping ones are distributed in the market, abnormality in a manufacturing process of the drink is imagined, by which a bad reputation in a hygiene aspect could be incurred. Thus, in the case of occurrence of the double-capping, it should be detected immediately, and market distribution of the container in the double-capping state should be prevented.

However, a prior art for effectively detecting the double-capping shown in FIG. 7 and FIG. 8 has not yet been proposed.

Here, it can be considered that a camera is disposed in a production line, and the double capping is detected by a moving image in which a container (container being filled with the drink and capped) conveyed in a manufacturing process is photographed by the camera, but there is not such a space for disposing the camera in the production line.

Moreover, such a camera being able to photograph the double capping is expensive, and therefore, causes a rise in a manufacturing cost of the drink product.

As the other prior arts, an art for detecting defective gluing of a box, for example, is proposed (see Patent Literature 1), but such prior art cannot detect the aforementioned "double capping" of the container.

CITATION LIST

Patent Literature

[Patent Literature 1]
U.S. Pat. No. 5,387,171

SUMMARY OF INVENTION

Technical Problem

The present invention was proposed in view of the aforementioned problems of the prior arts and has an object to provide a detection device which, in a case of occurrence of a phenomenon in which two caps are disposed on one container (so-called "double capping"), reliably detects that immediately.

Solution to Problem

The detection device (10) of the present invention is characterized in that on a production line (100: manufacturing device) of a product in which an opening (1A: mouth portion) of a container (1) is sealed with a cap (2), a proximity sensor (3) is provided along a path on which the container (1) moves, an area detected by the proximity sensor (3) is an area where the cap (2) cannot be present in a normal state (a state in which double capping has not occurred), the two caps (2) are attached in a row to the one container (1), and a subsequent cap (2-1) can be brought into close contact with a container surface (so-called "close-contact type double capping" shown in FIG. 7 can be occurred), and the container (1) to which the two caps (2) are attached continuously is detected by the proximity sensor (3).

Here, the proximity sensor (3) is preferably provided in an area where the container (1) rotates in the path on which the container (1) is conveyed (curling device 20, for example).

And the proximity sensor (3) is preferably provided in plural (preferably six units) in an area being substantially the same range as an outer peripheral dimension of the container (1) along the path on which the container (1) is conveyed.

In this specification, the term "double capping" is a term meaning a state where the two caps (2) are attached to the one container (1).

And in the "double capping", there are two types, that is, a case in which the subsequent cap (2-1) is brought into close contact with the container outer periphery (state shown in FIG. 7, so-called "close-contact type double capping") and a case in which the subsequent cap (2-1) is separated from the container outer periphery and turned over upward (state shown in FIG. 8, so-called "turn-over type double capping").

Also, a detection device (10A) of the present invention is characterized in that on the production line (100: manufacturing device) of a product in which an opening (1A: mouth portion) of the container (1) is sealed with the cap (2), a sensor (4: transmission sensor, for example) including a transmitter (4A: projector, for example) and a receiver (4B: optical receiver, for example) is provided along a path on which the container (1) moves, an area detected by the sensor (4) is an area where the cap (2) cannot be present in a normal state (a state in which double capping has not occurred), the two caps are attached in a row to the one container, and the subsequent cap is separated from the container surface and is turned over (state in which the turn-over type double capping shown in FIG. 8 has occurred); and the container to which the two caps are attached continuously is detected (so-called "turn-over type double capping" is detected) by the sensor (4).

Also, the sensor (4) is preferably provided in an area where the container rotates in the path on which the container (1) is conveyed (the curling device 20, for example) or an area after the rotating operation (an area being on a downstream side of the curling device 20, for example).

And the sensor (4) is preferably a transmission sensor (a transmission type fiber sensor, for example).

Furthermore, the detection device (10, 10A) of the present invention is characterized in that on the production line (100: manufacturing device) of a product in which the opening (1A: mouth portion) of the container (1) is sealed with the cap (2), two types of sensors, that is, the proximity sensor (3) and the sensor (4: transmission sensor, for example) including the transmitter (4A: projector, for example) and the receiver (4B: optical receiver, for example) are provided along a path on which the container (1) moves, an area detected by the sensors (the two types of sensors 3, 4) is an area where the cap (2) cannot be present in a normal state (a state in which double capping has not occurred), and the subsequent cap can be present in a case where the two caps (2) are attached in a row to the one container (1); and the container to which the two caps are attached continuously (a double capping container) is detected by the sensors (the two types of sensors 3, 4).

In this case, the proximity sensor (3) is preferably provided in an area where the container (1) rotates in the path on which the container (1) is conveyed (the curling device 20, for example).

And the proximity sensor (3) is preferably provided in plural (preferably six units) in an area being substantially the same range as the outer peripheral dimension of the container (1) along the path on which the container (1) is conveyed.

Moreover, the sensor (sensor 4 including the transmitter 4A and the receiver 4B) is preferably provided in an area where the container rotates in the path on which the container (1) is conveyed (the curling device 20, for example) or an area after the rotating operation (an area on a downstream side of the curling device 20, for example).

And the sensor (4) is preferably a transmission sensor (a transmission type fiber sensor, for example).

Also, in the present invention, it is preferable that:

the receiver (4B: optical receiver, for example) of the transmission sensor (4) is disposed on a side opposite to the transmitter (4A: projector, for example) with respect to a line on which the container (1) is conveyed, and in the normal state (a state in which the double capping has not occurred), emission (of light or ultrasonic waves) is performed from an irradiation-side device (4A) and is received by a reception-side sensor (4B), however, in a case that the two caps (2) are attached to the one container (1) and the subsequent cap (2-1) is separated from the container surface and is turned over (in a case that the turn-over type double capping shown in FIG. 8 has occurred), they are preferably disposed so that the emission (of the light or the ultrasonic waves) is not received by the reception-side sensor (4B).

But, in the present invention, it is possible that:

the irradiation-side device (4A) and the reception-side sensor (4B) are disposed on the same side with respect to the line on which the container (1) is conveyed, and in the normal state in which the double capping has not occurred, the emission (of the light or the ultrasonic waves) is performed from the irradiation-side device (4A) and is not received by the reception-side sensor (4B), however, in a case where the two caps (2) are attached to the one container (1), and the subsequent cap (2-1) is separated from the container surface and is turned over (in a case where the turn-over type double capping shown in FIG. 8 has occurred), the emission (of the light or the ultrasonic waves) is reflected by the turned over subsequent cap (2-1) and is received by the reception-side sensor (4B).

Advantageous Effects of Invention

According to the detection device (10) of the present invention including the aforementioned constructions, the proximity sensor (3) is provided along the path on which the container (1) moves, and in the normal state in which the double capping has not occurred as shown in FIG. 6, the proximity sensor (3) has the container surface on which no cap is present as an inspection region. And in a case that the subsequent cap (2-1: entrained cap) of the close-contact type double capping is in close contact with the container surface (case shown in FIG. 7), the entrained subsequent cap (2-1) is located in the region.

Therefore, if the close-contact type double capping as shown in FIG. 7 has occurred, the proximity sensor (3) detects that the cap (2) is proximate to the container surface and detects that the close-contact type double capping shown in FIG. 7 has occurred.

On the other hand, in the case of the double capping in the state where the subsequent cap (2-1) is turned over as in the type shown in FIG. 8 (so-called "turn-over type double capping"), the entrained subsequent cap (2-1) is separated from the container surface and thus, it cannot be detected by the aforementioned proximity sensor (3).

However, in the detection device (10A) of the present invention, since the sensor (4) including the transmitter (4A: projector, for example) and a receiver (4B: optical receiver, for example) such as the transmission sensor (a translucent type fiber sensor or the like), for example, is provided along the path of the container (1), if the double capping in which the subsequent cap (2-1) is turned over as shown in FIG. 8 (so-called "turn-over type double capping") has occurred, since the subsequent cap (2-1) separated from the container outer periphery and turned over upward shields light or the like (including ultrasonic waves or the like) emitted from the transmitter (4A) of the sensor (4), the sensor of the receiver (4B) cannot receive the light, the ultrasonic waves or the like anymore. Therefore, when the container (1) passes through a spot where the sensor (4) is provided, if the emitted light or the like is not detected by the reception-side sensor (4B), it means that the subsequent cap (2-1) separated from the container outer periphery of the cap shown in FIG. 8 and turned over upward shields the emitted light or the like, and occurrence of the double capping cap in the turn-over state shown in FIG. 8 is detected.

Alternatively, in a case that, it is constructed such that the subsequent cap (2-1) separated from the container outer periphery and turned over upward reflects the light, ultrasonic waves or the like emitted from the transmitter (4A) of the sensor (4), and that the sensor of the receiver (4B) receives the reflected light, ultrasonic waves or the like, when the container (1) passes through the spot where the sensor (4) is provided, the emitted light or the like is detected by the reception-side sensor (4B), the reflection of the emitted light or the like is detected, which reflection are reflected by the subsequent cap (2-1) separated from the container outer periphery of the cap shown in FIG. 8 and turned over upward, and occurrence of double capping in the turn-over state shown in FIG. 8 is detected.

As described above, according to the detection device (10, 10A) of the present invention, the close-contact type double capping of a type in which the subsequent cap (2-1) is in close contact with the container surface as shown in FIG. 7 and the turn-over type double capping of a type in which the subsequent cap (2-1) is separated from the container outer periphery and is turned over upward as shown in FIG. 8 can be both detected reliably.

Here, the proximity sensor (3) and/or the sensor (4) including the transmitter (4A) and the receiver (4B) are used in the present invention, and there is no need to provide a camera for photographing the container after being capped in conveyance. Thus, there is no need to separately provide a mechanism for installing the camera in the production line.

Moreover, the proximity sensor (3) and/or the sensor (4) including the transmitter (4A) and the receiver (4B) are cheap as compared with the camera, and thus, a cost increase caused by use of an expensive camera can be prevented.

DESCRIPTION OF EMBODIMENTS

Hereinafter, an embodiment of the present invention will be explained by referring with the attached drawings.

Figure 1:
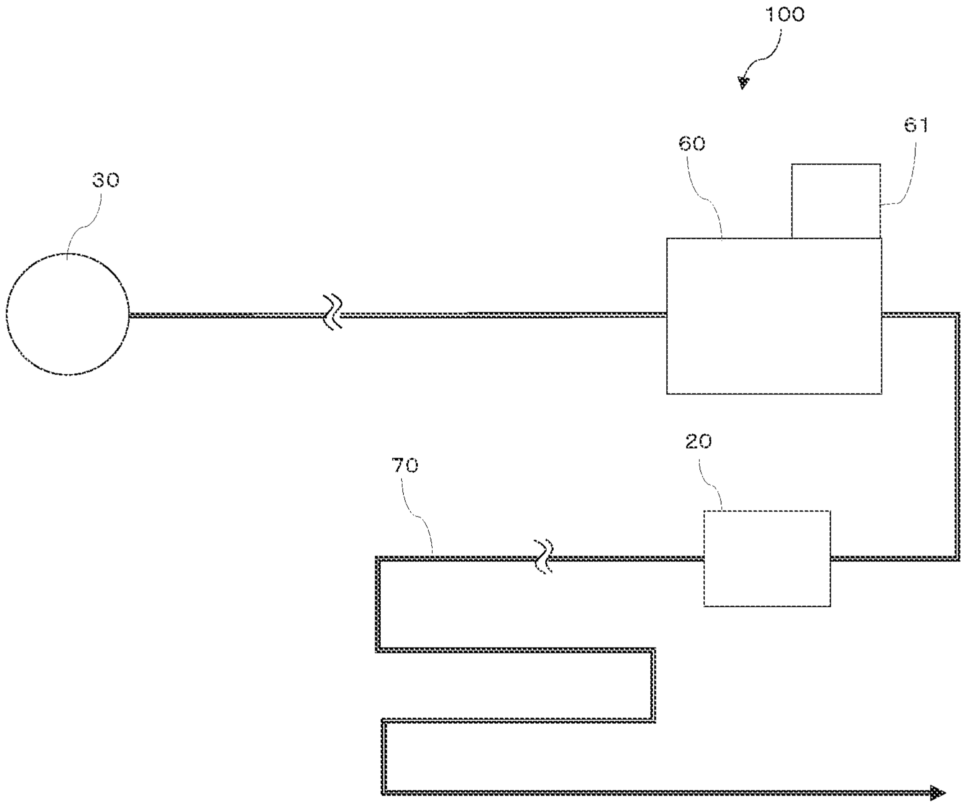
FIG. 1 is an explanatory diagram illustrating a production line to which an embodiment of the present invention is applied.

In FIG. 1, a production line 100 (manufacturing device) to which a detection device 10, 10A (not shown in FIG. 1) according to the embodiment of the present invention is applied comprises an erecting machine 30, a filling sealing machine 60, and a curling device 20. In the filling sealing machine 60, a cutting head 61 is also provided. Moreover, in the production line 100, an inspection device and a manufacturing device can be provided if necessary.

Although not illustrated clearly, the erecting machine 30 has a function for aligning containers with openings (mouth portions) directed upward and a function for sending them to a subsequent process sequentially.

In the filling sealing machine 60, after drink (not shown) is filled in a container 1 (see FIGS. 2 to 10), a cap supplied from the cutting head 61 is attached thereto, and sealed. The cutting head 61 has a mechanism for punching a sheet-shaped cap material into a certain shape and for molding it into a predetermined cap shape. Therefore, the caps can be supplied continuously to the filling sealing machine via a conveyance path (not shown).

Figure 6:
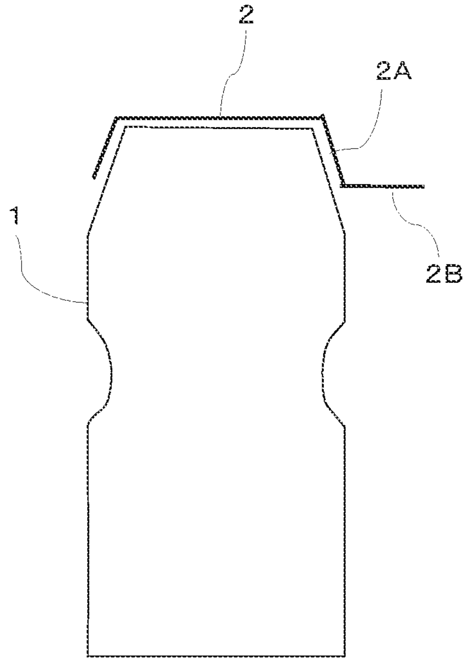
FIG. 6 is an explanatory diagram illustrating a cap and its pull-tab immediately after appropriate capping.

In the container 1 immediately after being sealed, a skirt portion 2A and a pull-tab portion 2B of a cap 2 are in a state that they are separated and spread with respect to the container 1 (see FIG. 6, for example). The curling device 20 is a device for bringing the skirt portion 2A and the pull-tab portion 2B of the cap 2 in separated and spread state with respect to the container 1 into close contact with an outer surface of the opening 1A of the container 1.

The detection device 10 (detection device for double capping) according to the illustrated embodiment is provided in the curling device 20, and the curling device 20 including the detection device 10 will be described in detail in reference with FIGS. 2-11. Moreover, in FIG. 1, the container 1 (drink product) having passed through the curling device 20 is taken out of the line of the manufacturing device 100 through a path 70.

Figure 2:
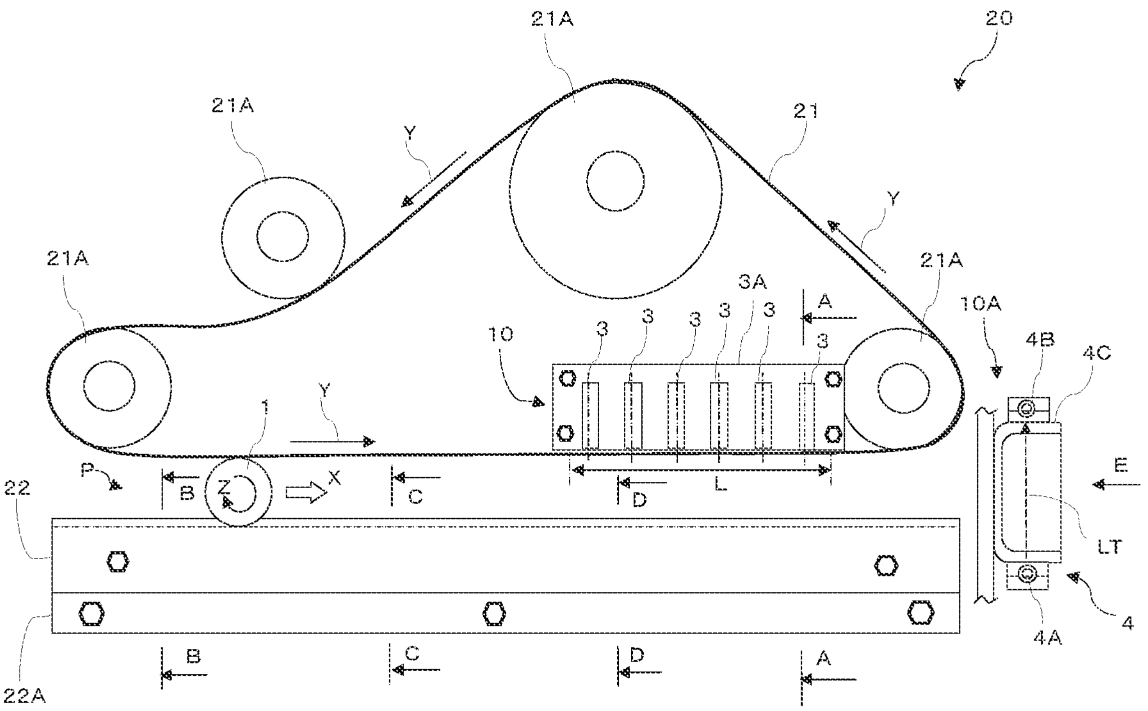
FIG. 2 is a plan view of a curling device in the embodiment.

In FIG. 2, the curling device 20 includes a belt 21 and a curling plate 22, and the belt 21 and the curling plate 22 are disposed on both sides of the path (passage) on which the container 1 (sealed container) moves in an arrow X direction, respectively. Here, instead of the belt 21, a rope or the like can be also used.

The belt 21 is driven by a plurality of drive wheels 21A being mounted on a side of a curling device main-body (not shown) and is circulated in an arrow Y direction. On the other hand, the curling plate 22 is fixed to the curling device main-body by a bracket 22A.

Figure 3:
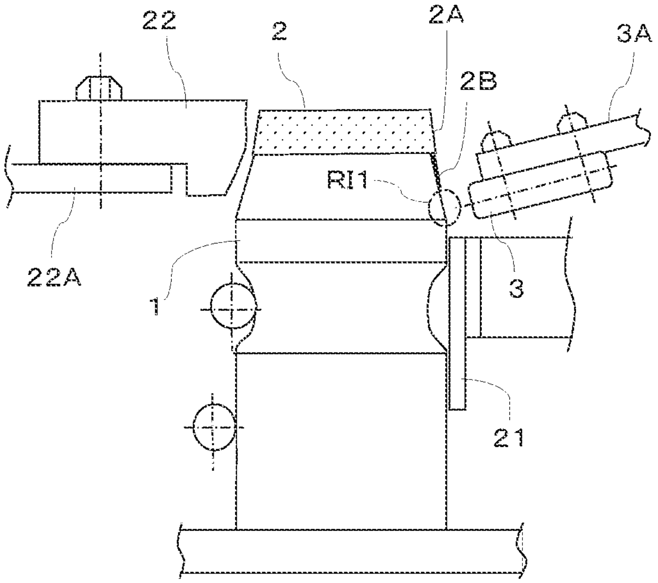
FIG. 3 is a sectional view illustrating an A-A section in FIG. 2.
Figure 4:
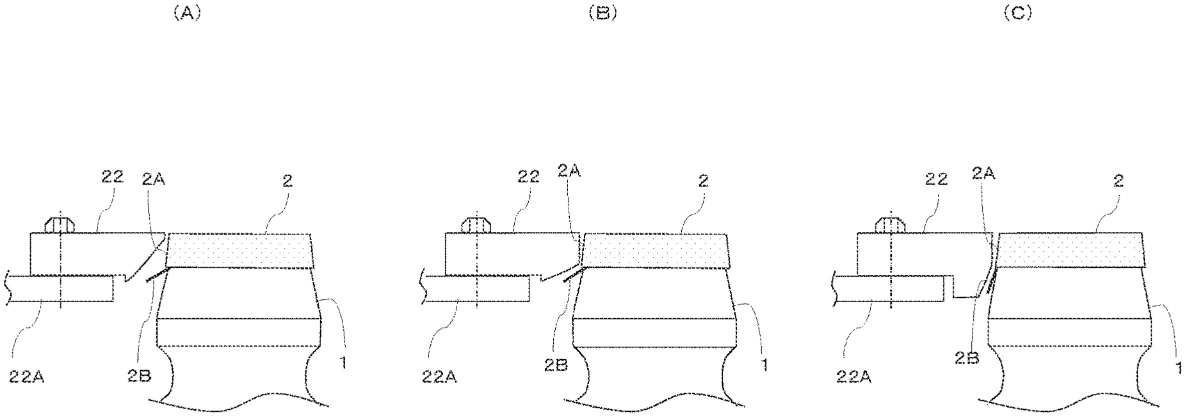
FIG. 4 are sectional view illustrating a B-B section, a C-C section, and a D-D section of the curling plate in the curling device in FIG. 2.

The belt 21 causes the container 1 to move in the arrow Y direction (FIG. 2), and as shown in FIG. 3, the belt 21 presses a region below a part capped with the cap 2 in the container 1 toward the side of the curling plate 22. Then, the curling plate 22 presses a side part of the cap 2 (including the skirt portion 2A and the pull-tab portion 2B of the cap 2) which cap has been capped to the container 1.

By the circulation of the belt 21 in the arrow Y direction (FIG. 2), the container 1 being sandwiched between the belt 21 and the curling plate 22 is rotated as indicated by an arrow Z shown in FIG. 2. Together with the rotation of the container 1, the skirt portion 2A and the pull-tab 2B of the cap 2 being contacted with the curling plate 22 are brought into close contact uniformly with the surface of the container 1 over the entire circumference.

In order that the skirt portion 2A and the pull-tab 2B of the cap 2 are not overlapped and folded (folded back) but brought into contact with the surface of the container 1 normally a sectional shape (sectional shape of a part which presses the container 1) of the curling plate 22 is constructed so as to gradually change from the upstream to the downstream (from left side to the right side in FIG. 2).

A section B-B (see FIG. 2) in the curling plate 22 is shown in FIG. 4A, a section C-C is shown in FIG. 4B, and a section D-D is shown in FIG. 4C. In FIGS. 4A to 4C, in addition to the sectional shapes of the curling plate 22, a part in the container 1 being capped with the cap 2 is also shown.

In the section B-B (refer to FIG. 4A) on the upstream side shown in FIG. 4A, the curling plate 22 presses only an upper end portion of the cap 2. On the other hand, in the section C-C on the downstream side of the section B-B shown in FIG. 4B, the curling plate 22 presses the skirt portion 2A of the cap 2 excluding the pull-tab portion 2B. In the section D-D shown in FIG. 4C on the further downstream side of the section C-C shown in FIG. 4C, the curling plate 22 presses the entire side part of the cap 2 including the pull-tab portion 2B.

Subsequently, the reasons why two caps are disposed on one container and the phenomenon so-called "double capping" occurs will be explained, in reference with FIGS. 5, 6, 7, and 8.

When the cap 2 supplied from the cutting head 61 (FIG. 1) is attached or capped to the mouth portion 1A of the container 1, the cap 2, which is punched out of aluminum foil, covers (caps) to the mouth portion 1A of the container 1. As shown in FIG. 5A, in a usual situation, the cap 2 before capping the container 1, only the cap 2 on a frontmost row on the container 1 side is drawn by vacuum (vacuum sucking means is not shown in drawings) and held so as not to fall. Caps 2-1, 2-2 (shown by broken lines), which are subsequent to the cap 2 on the frontmost row, are stopped (dammed) by the cap 2 on the frontmost row so as not to advance to the container 1 side, but the subsequent caps 2-1, 2-2 are biased to the side of the cap 2 on the frontmost row by the gravity. At a situation shown in FIG. 5A, the container 1 is filled with the drink which is a content.

As shown in FIG. 5A, at a stage before capping the container 1, the cap 2 is held in a state that the cap 2 is inclined with respect to a horizontal direction, and a front edge (left edge in FIG. 5A) of the mouth portion 1A of the container 1 (filled with the drink) is caught by a spot 2C on the lowermost end of the cap 2 in the situation in which the cap 2 incline with respect to the horizontal direction and the container 1 entrains the cap 2 against the holding force of the vacuum in the direction (direction shown by an arrow U) in which direction the container 1 moves. As the result of the entrainment of the front edge of the mouth portion 1A of the moving container 1 by catching the lowermost end spot 2C of the cap 2, the cap 2 is separated from the vacuum sucking means, not shown, and is caused to cap (or cover) the mouth portion 1A of the container 1 by a weight of the cap 2.

When the cap 2 on the frontmost row is entrained, the subsequent cap 2-1 moves to the position of the cap on the frontmost row by the gravity, and the cap 2-1 is held by the vacuum of the vacuum sucking means, not shown.

As shown in FIG. 5B, the pull-tab 2B, which is to be pinched by the fingers and pulled when the cap 2 is to be removed from the container 1, is provided on the cap 2, but at the time when the cap 2 is punched and molded by the cutting head 61, the pull-tab 2B extends substantially in the horizontal direction as the cap 2 shown in FIG. 6.

Figure 5:
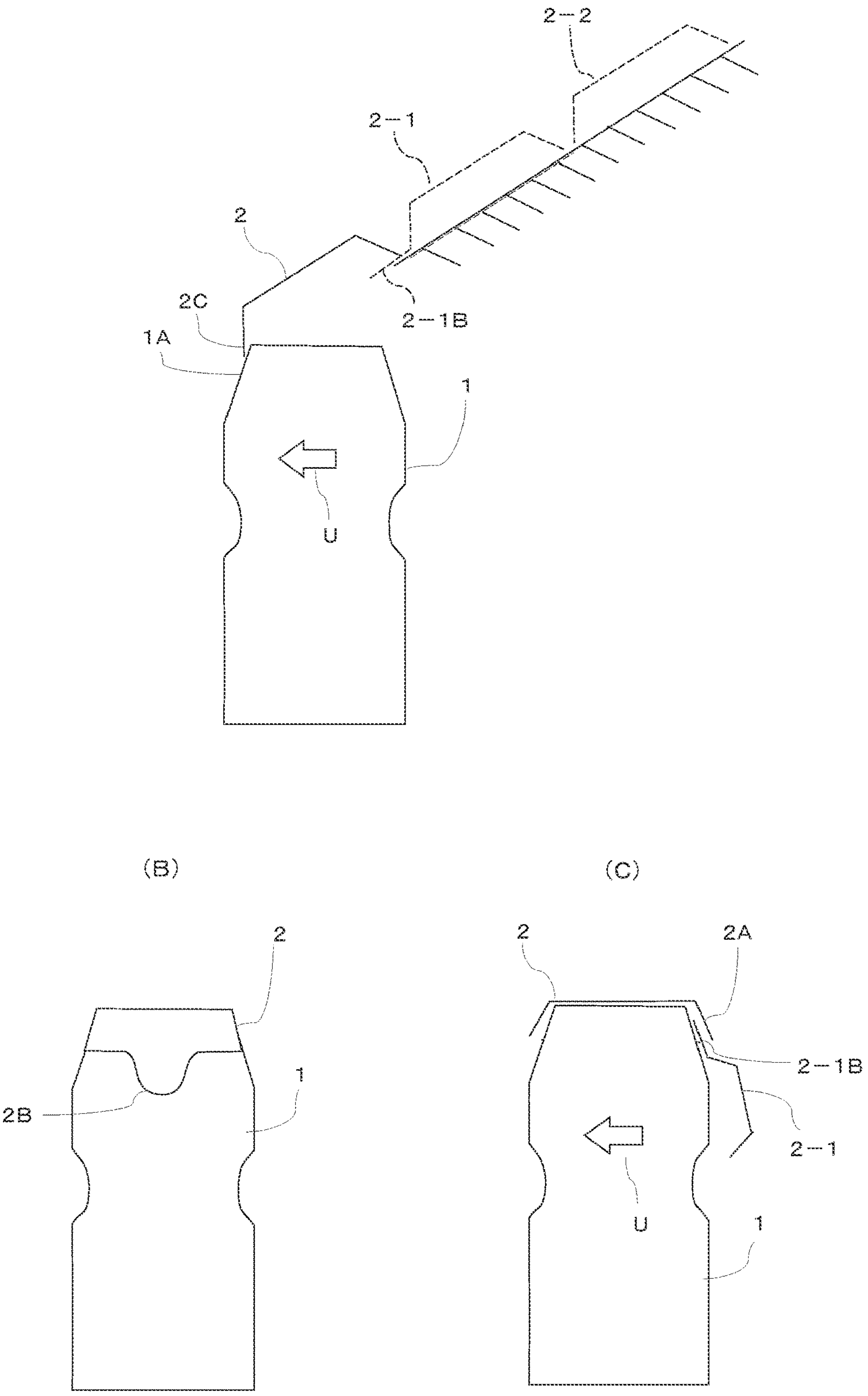
FIG. 5 are explanatory diagrams illustrating a mechanism of generation of double capping.

In FIGS. 5, when the container 1 is to be covered (capped) with the cap 2, it is not detected or grasped that a position of a pull-tab 2-1B (see FIG. 5A) in a circumferential direction.

When the cap 2 on the frontmost row covers to the container 1, in a case that the pull-tab 2-1B of the subsequent cap 2-1 extends toward the cap 2 on the frontmost row and the pull-tab 2-1B enters to below the cap 2, at the time that the cap 2 covers the container 1, the cap 2-1 is entrained by the cap 2 in some cases. As a result, the phenomenon so-called “double capping” is happened or occurred. Moreover, there is a space between the skirt portion 2A and an outer surface of the container 1, and the pull-tab 2-1B of the subsequent cap 2-1 enters to such the space (refer to FIG. 5C). it is difficult to exclude only the subsequent cap 2-1 by targeting it in continuous production steps or manufacturing steps.

Such the double-capping phenomenon as mentioned above is caused that a force for moving the container 1 moves is stronger than the holding force by the vacuum for holding the cap at the spot, however, if the force for moving the container 1 is not stronger than the holding force by the vacuum for moving the container 1, the cap 2 covering the container mouth portion 1A shown in FIG. 5A cannot move relative to the container 1.

Figure 7:
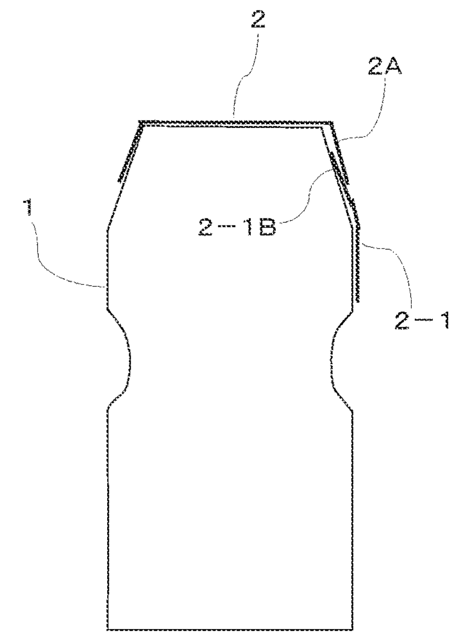
FIG. 7 is an explanatory diagram illustrating the double capping in close contact with a container surface.

Here, there are two types of patterns in the so-called “double capping” phenomenon, which types are depended on a behavior of the container 1 after passage of the filling sealing machine 60 and a behavior of the container 1 in the curling device 20. In one of said two types of patterns in the “double capping” phenomenon, as shown in FIG. 7, the subsequent cap 2-1 is in close contact with the surface of the container 1. In the other pattern of said types of patterns in the “double capping” phenomenon, as shown in FIG. 8, the subsequent cap 2-1 is separated from the surface of the container 1 and is turned over.

In the double capping of the type shown in FIG. 7, in a state that the subsequent cap 2-1 (refer to FIG. 5C) is entrained by the container 1 at the time the cap 2 is capped to the container 1, the cap 2 is sandwiched and pressed between the belt 21 and the curling plate 22 in the curling device 20 (FIG. 2), and as a result, the subsequent cap 2-1 is in close contact with the surface of the container 1 in a state that the pull-tab 2-1B of the subsequent cap 2-1 enters into the space between the skirt portion 2A of the cap 2 and the outer surface of the container 1.

In the state shown in FIG. 7 (state in which the subsequent cap 2-1 of the double capping is in close contact with the surface of the container 1), the subsequent cap 2-1 is present in a region below the mouth portion of the container 1, on which the cap 2 (the skirt portion 2A, the pull-tab 2B) is not present in the normal state where the double cap has not occurred.

Figure 8:
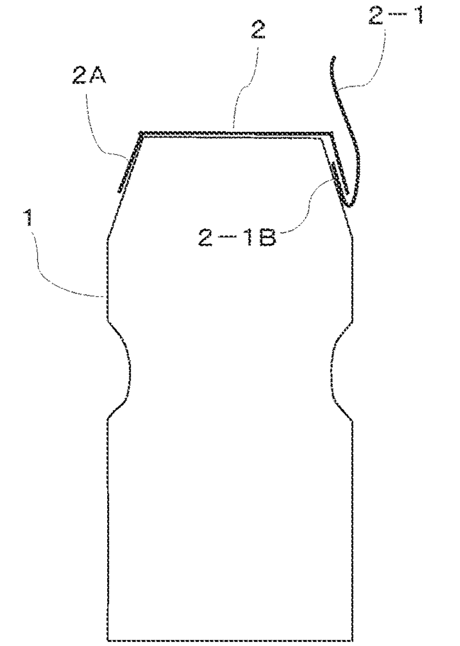
FIG. 8 is an explanatory diagram illustrating the double capping separated from the container surface and turned over.

On the other hand, in the double capping of the type shown in FIG. 8, it is similar to the double capping shown in FIG. 7 in a point that the pull-tab 2-1B of the subsequent cap 2-1 is in close contact with the surface of the container in a state that the pull-tab 2-1B enters in a space between the skirt portion 2A of the cap 2 and the outer surface of the container 1, however, a part of the subsequent cap 2-1 is turned over in upward direction, that is, said part is turned over to above the container 1, and the subsequent cap 2-1 extends to a region in which the cap 2 is not present in the normal state where the double capping has not occurred, that is, the subsequent cap 2-1 extends in the region above the container 1 in the double capping of the type shown in FIG. 8.

In the detection device according to the illustrated embodiment, the double capping of the type shown in FIG. 7 in close contact with the outer surface of the container 1 (in this specification, it is described as the “close-contact type double capping” in some cases) is detected by the proximity sensor 3. On the other hand, the double capping of the type shown in FIG. 8, that is, the double capping in which the subsequent cap 2-1 is turned over from the surface of the container 1 (in this specification, it is described as the “turn-over type double capping” in some cases) is detected by the transmission sensor 4. Here, the transmission sensor 4 is an example of a sensor including the transmitter 4A (projector, for example) and the receiver 4B (optical receiver, for example).

First, detection of the double capping of the type shown in FIG. 7, that is, the detection of the so-called “close-contact type double capping” will be explained.

In FIG. 2, the detection device 10 which detects the close-contact type double capping is provided in the curling device 20. In the curling device 20, by means of the belt 21 and the curling plate 22, the container 1 moves in the arrow X direction while rotating in the arrow Z direction. In a path in which the container 1 moves in the arrow X direction and rotates in the arrow Z direction, the belt 21 and the curling plate 22 are positioned on the both sides thereof (both sides in the above-below direction in FIG. 2), and the proximity sensor 3 is provided at a position along the path.

In the illustrated embodiment, six units of the proximity sensors 3 are provided and they are positioned on a region on the downstream side in the container moving direction of the path. As shown in FIGS. 2 and 3, the proximity sensor 3 is mounted on the curling device main-body by mean of a bracket 3A at a position close to the belt 21. The reason why the six units of the proximity sensors 3 are positioned in the illustrated embodiment will be described later.

In FIG. 3 showing the A-A section shown in FIG. 2, a detection region RI1 of the proximity sensor 3 is a region slightly below the cap 2 (including the skirt portion 2A and the pull-tab 2*b*) in the container 1 which is passing. Thus, in the normal state (a state in which the double capping has not occurred, and also, the subsequent cap 2-1 is not in close contact with the container 2), the cap 2 is not present on the outer surface of the container 1, also the cap 2 (2-1) is not present in the detection region RI1. In other words, the detection region RI1 is a region where the cap 2 is not detected in the normal state.

On the other hand, if there is the close-contact type double capping (shown in FIG. 7), a part of the subsequent cap 2-1 is in close contact with the outer surface of the container 1 passing in the detection region RI1. Thus, if there is the close-contact type double capping (FIG. 7) in the container 1 passing in the detection region RI1, the subsequent cap 2-1 is in close contact with the surface of the container 1 passing in the detection region RI1, and it is detected by the proximity sensor 3.

In FIGS. 2 and 3, the close-contact type double capping (shown in FIG. 7) occurs in the case that the cap 2 and the subsequent cap 2-1 are pressed by the curling plate 22 to the container 1 side and brought into close contact with the surface of the container 1.

As described above, if the close-contact type double capping occurs, a part of the subsequent cap 2-1 is brought into close contact with the region on the surface of the container 1 (the detection region RI1 in FIG. 3) (shown in FIG. 7) in which region the cap 2 is not present in the normal state (a state where the close-contact type double capping is not present).

If aluminum, which is metal (the caps 2, 2-1 are made of aluminum), moves to a position being proximate to the inspection region RI1 where the caps 2, 2-1 are not present in the normal state, the subsequent cap 2-1 made of aluminum is detected by the proximity sensor 3. Detection of the presence of aluminum by the proximity sensor 3 means that the cap 2 (the subsequent cap 2-1) is present on the surface of the container 1 (the inspection region RI of the proximity sensor 3) where the cap 2 is not present in the normal state, and thus, presence of a part of the subsequent cap 2-1 in the inspection region RI1 can be confirmed, and it is determined that the close-contact type double capping has occurred.

As will be explained later in reference with FIG. 11, when the close-contact type double capping is detected, necessary processing, procedure such as an alarm and the like are carried out.

If the container 1 is in the normal state (in which state the double capping has not occurred), the proximity sensor 3 does not detect aluminum (the cap 2, the subsequent cap 2-1), and thus, it can be determined that the container 1 is in the normal state (in which the close-contact type double capping has not occurred).

Here, at a position indicated by a sign "P" in FIG. 2, that is, at a position near an inlet of an advance path of the container 1, it is impossible to guess or predict a position in the circumferential direction of the container 1 at which position the subsequent cap 2-1 in the close-contact type double capping contacts with the container 1 closely. Moreover, the proximity sensor 3 cannot perform accurate detection unless a case that the inspection region RI1 is set at a distance extremely close from the proximity sensor 3, and thus, presence of the subsequent cap 2-1 in the inspection region RI1 cannot be detected by the proximity sensor 3 unless a case that the distance between the proximity sensor 3 and the container 1 is extremely small.

Therefore, if only one unit of the proximity sensor 3 is provided, depending on the position in the circumferential direction of the container 1 at which the subsequent cap 2-1 of the double capping is contact with the container's surface closely, even if the close-contact type double capping (FIG. 7) has occurred, there are possibilities that the subsequent cap 2-1 is not present in the inspection region RI1, and the proximity sensor 3 cannot detect occurrence of the close-contact type double capping.

In the illustrated embodiment, since the container 1 moves in the X direction while rotating in the Z direction (see FIG. 2), by providing six units of the proximity sensors 3 and by disposing the six units of the proximity sensors 3 at positions separated by a center angle of 60° each of the container 1 so that each of the proximity sensors 3 can carry out detection in the circumferential direction of the container 1 at equal intervals, the circumferential direction of the container 1 can be detected equally by the proximity sensors 3.

According to experiments carried out by the inventors, it was found that, by providing six units of the proximity sensors 3 and by disposing them so that each proximity sensor 3 detects an area in the circumferential direction separated only by the center angle of 60° of the container 1 with respect to the adjacent proximity sensor 3, in a case that the subsequent cap 2-1 in the close-contact type double capping in FIG. 7 is occurred at any position on the circumference of the container 1, such the close-contact type double capping can be detected reliably.

Moreover, in FIG. 2, a dimension L extending in the upstream/downstream direction (left-right direction shown in FIG. 2) of the region in which the six proximity sensors 3 are provided is set to be slightly longer than the outer periphery of the container 1, and thus, a risk of a detection error is reduced.

In the illustrated embodiment, the proximity sensor 3 is provided on a side (the belt 21 side) opposite to the curling plate 22 with respect to the advance path of the container 1.

As described above, the proximity sensor 3 does not perform sensing function unless the distance from the caps 2, 2-1 (made of aluminum) is short, and it is very strict that a condition relating to a distance between the sensor 3 and the caps 2, 2-1. Thus, on the curling plate 22 side, if the proximity sensor 3 is disposed at a position capable of detecting the close-contact type double capping, the proximity sensor 3 interferes with the curling plate 22. As obvious in reference with FIG. 3, it is difficult to dispose the proximity sensor 3 on the curling plate 22 side.

Therefore, in the illustrated embodiment, the proximity sensor 3 is not provided on the curling plate 22 side with respect to the advance path of the container 1 but is provided on the belt 21 side which is opposite to the curling plate 22.

In the illustrated embodiment, since the cap 2 is made of aluminum, a type of the proximity sensor 3 which detects metal is employed. However, even in a case that the cap made of non-metal is applied, it is possible to detect the close-contact type double capping (double capping) by using a proximity sensor of a type reacting to those other than metal.

In other words, the detection of the "close-contact type double capping" by the proximity sensor can be carried out in a case that a material of a cap is different from the cap 2 in the illustrated embodiment by selecting the proximity sensor of an appropriate type. However, in such the case, it is necessary that the material of the cap to be detected is different from the material of the container.

Here, the proximity sensor 3 can detect the close-contact type double capping (shown in FIG. 7) in close contact with the container surface, but the "turn-over type double capping" shown in FIG. 8 cannot be detected by the proximity sensor 3. Though it depends on a degree of turn-over, since a position of the turned over double capping is located in a region above the container 1 and a distance from the proximity sensor 3 is long, it is difficult for the proximity sensor 3 to set the inspection region RI1 at a position at which it is capable for detecting the "turn-over type double capping".

Thus, in the illustrated embodiment, the "turn-over type double capping" shown in FIG. 8 is detected by the transmission sensor 4 (an example of a sensor including the transmitter 4A and the receiver 4B).

In FIG. 2, the detection device 10A which detects the turn-over type double capping is constructed by the transmission sensor 4 (transmission type fiber sensor) disposed on the path on which the container 1 in the curling device 20 moves. The transmission sensor 4 is mounted on the curling device main-body by means of the bracket 4C in a region on the downstream side of the path (right side in FIG. 2).

As describe above, there are two types of the double capping, that is, the close-contact type double capping and the turn-over type double capping, in the illustrated embodiment, the detection device for the close-contact type double capping is indicated by a sign "10", while the detection device for the turn-over type double capping by a sign "10A". The illustrated embodiment includes both the detection device 10 of the close-contact double capping type and the detection device 10A of the turn-over type double capping.

Moreover, as described above, the transmission sensor 4 is an example of the sensor including the transmitter 4A and the receiver 4B.

Figure 9:
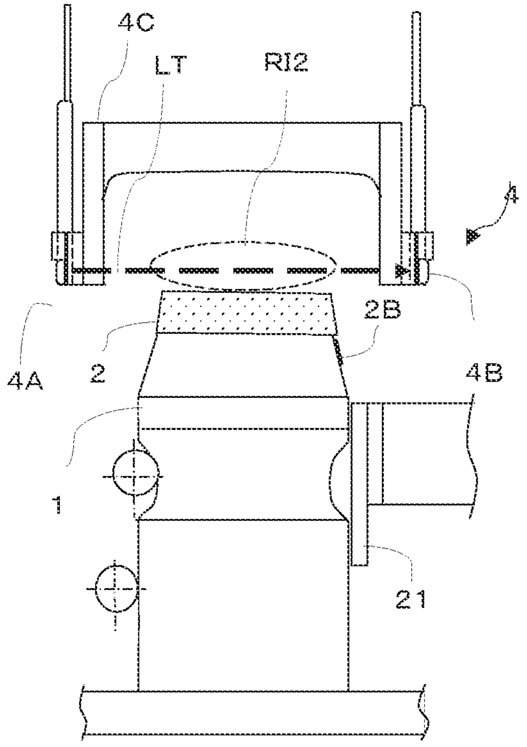
FIG. 9 is an explanatory diagram illustrating a transmission sensor and an E-arrow view of FIG. 2.

As shown in FIGS. 2 and 9, the transmission sensor 4 includes an irradiation-side device 4A (a projector, for example) and a reception-side sensor 4B (an optical receiver, for example), and the projector 4A and the optical receiver 4B are disposed on the both sides (opposite sides each other) with respect to the path between them on which path the container 1 is conveyed.

In the illustrated embodiment, light LT is emitted from the projector 4A to the optical receiver 4B. In a case that the turn-over type double capping is occurred, since the irradiation light LT being emitted from the projector 4A to the optical receiver 4B is shielded by the turned over subsequent cap 2-1, the optical receiver 4B does not receive the irradiation light LT. As a result, the transmission sensor 4 detects occurrence of the turn-over type double capping.

The detection of the turn-over type double capping by the transmission sensor 4 will be further explained in reference with FIG. 9.

In FIG. 9, a detection region RI2 in which the detection of the turn-over type double capping is carried by the irradiation light LT emitted in the transmission sensor 4 is a region above the mouth portion of the cap 2 of the container 1 passing in the path.

Thus, in the normal state in which the turn-over type double capping has not occurred, the subsequent cap 2-1 is not present in the detection region RI2, and the irradiation light LT emitted from the projector 4A is not shielded but is received by the optical receiver 4B. As a result, it can be determined that the turn-over type double capping has not occurred.

On the other hand, in a case that the turn-over double capping occurs, a part of the subsequent cap 2-1 passes through in the detection region RI2. Here, as shown in FIG. 8, the subsequent cap 2-1 is separated from the surface of the container 1 and is turned over (refer to FIG. 8) and thus, when the subsequent cap 2-1 passes through the detection region RI2 by movement of the container 1, the subsequent cap 2-1 shields the irradiation light LT emitted from the projector 4A. Thus, the optical receiver 4B does not receive the irradiation light LT, whereby the transmission sensor 4 detects the turn-over type double capping.

In other words, in the illustrated embodiment, in the detection region RI2, the irradiation light LT is not shielded but advances in the normal state in which the turn-over type double capping has not occurred, but in a state that the turn-over type double capping has occurred, the irradiation light LT is shielded by the subsequent cap 2-1.

As will be described later by referring to FIG. 11, if the turn-over type double capping is detected, an alarm and other required processing or procedure is carried out.

In the illustrated embodiment, the projector 4A and the optical receiver 4B are disposed on the both sides (opposite sides each other) with respect to the path of the container 1 between the projector 4A and the optical receiver 4B.

However, the projector 4A and the optical receiver 4B can be positioned on the same side with respect to said path of the container 1. For example, by positioning the optical receiver 4B at a position where the irradiation light LT reflected by the subsequent cap 2-1 can be received, in the normal state in which the turn-over type double capping has not occurred, the irradiation light LT emitted from the projector 4A is not received by the optical receiver 4B, however, in a case that a turned over cap of the turn-over type double capping is present, the irradiation light LT emitted from the projector 4A is reflected by the turned over subsequent cap 2-1 and is detected by the optical receiver 4B. As a result, occurrence of the turn-over type double capping can be detected.

However, in the turn-over type double capping, since a size, a position, an angle, a shape and the like of the turned over subsequent cap 2-1 are different, it is necessary for the optical receiver 4B to be positioned so that the light reflected by the turned over subsequent cap 2-1 is surely received by the optical receiver 4B, in order to improve detection accuracy of the turn-over type double capping.

Note that the sensor applied for detection of the turn-over double capping is not limited to the transmission sensor 4 which emits the light from an irradiator. Though not clearly illustrated, it is possible to detect the turn-over type double capping by emitting an ultrasonic wave and by receiving it by means of an ultrasonic sensor, for example. However, in a case that the container 1 moves at a high speed (approximately 40 m/minute, for example), it is difficult for the ultrasonic wave detection to detect turn-over type double capping by is difficult.

In the illustrated embodiment, as shown in FIG. 2, on the path on which the container 1 moves, the proximity sensor 3 is disposed or positioned on the upstream side, and the transmission sensor 4 is disposed or positioned on the downstream side.

However, it is possible to position (or dispose) the transmission sensor 4 on the upstream side of the proximity sensor 3.

Figure 10:
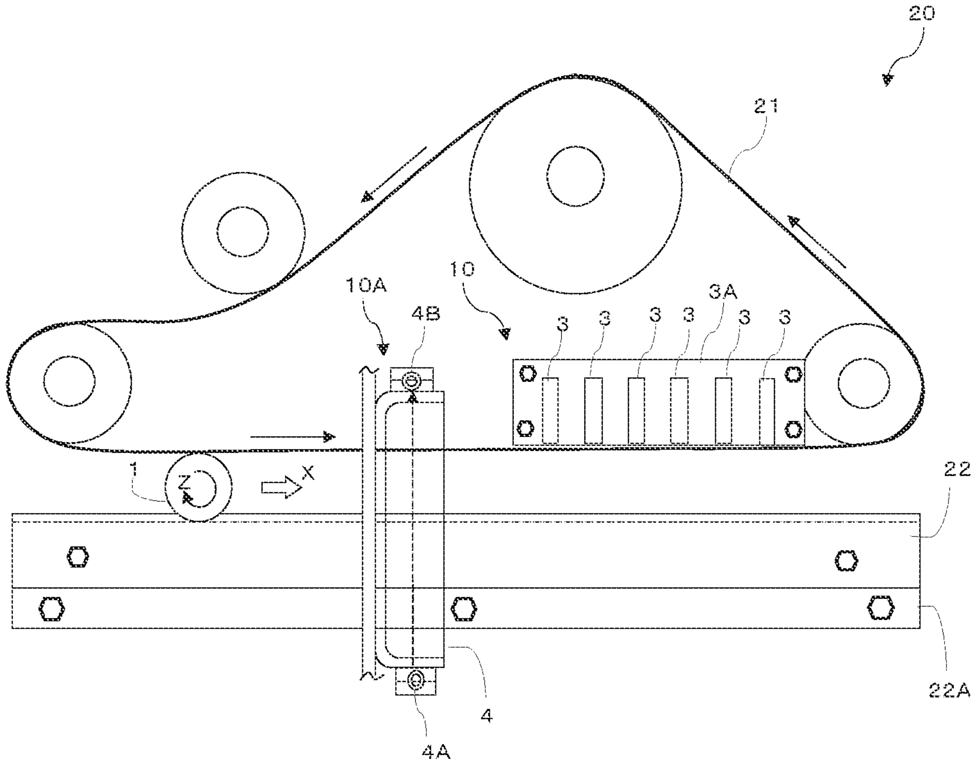
FIG. 10 is a plan view of the curling device in which the transmission sensor is disposed on a position being different with the position shown in FIG. 2.

In FIG. 10, the transmission sensor 4 is disposed on the upstream side (left side in FIG. 10) on the path on which the container 1 moves, and the proximity sensor 3 is disposed on the downstream side of the transmission sensor 4. Even if the transmission sensor 4 is disposed on the upstream side of the proximity sensor 3 as shown in FIG. 10, operations and effects thereof are similar to those carried out by the embodiment shown in FIG. 2.

In the illustrated embodiment, the proximity sensor 3 which detects the close-contact type double capping and the transmission sensor 4 which detects the turn-over type double capping are provided in the curling device 20, but the detection device 10, 10A which detect the double capping can be provided at a position other that curling device 20.

However, the proximity sensor 3 is preferably combined with a mechanism for rotating the container as combination of the belt 21 and the curling plate 22 in order to detect the "close-contact type double capping", which is the double capping of the type in close contact with the container 1. Moreover, as described above, in a case that the proximity sensor 3 is provided at a position other than the curling device 20, the number of installed proximity sensors 3 is not limited six.

On the other hand, regarding the transmission sensor 4, there is no mechanism to be separately combined in order to detect the "turn-over type double capping" which is the double capping of the turn-over type. However, it is necessary that the turn-over is completed at the time of inspection, and thus, it is preferably to install the transmission sensor on a position in an area during which the container passes or a position which is just downstream with respect to a rotation mechanism such as the curling device 20 or the like.

In order to detect the double capping with different patterns surely, it is preferable that the proximity sensor 3 and the transmission sensor 4 are combined in the double-capping detection device. However, detection can be carried out by means of either one of the sensors only, as long as an occurrence pattern of the double capping can be controlled.

Subsequently, by referring with FIG. 11 mainly, the procedure of the double capping detection will be explained.

Figure 11:
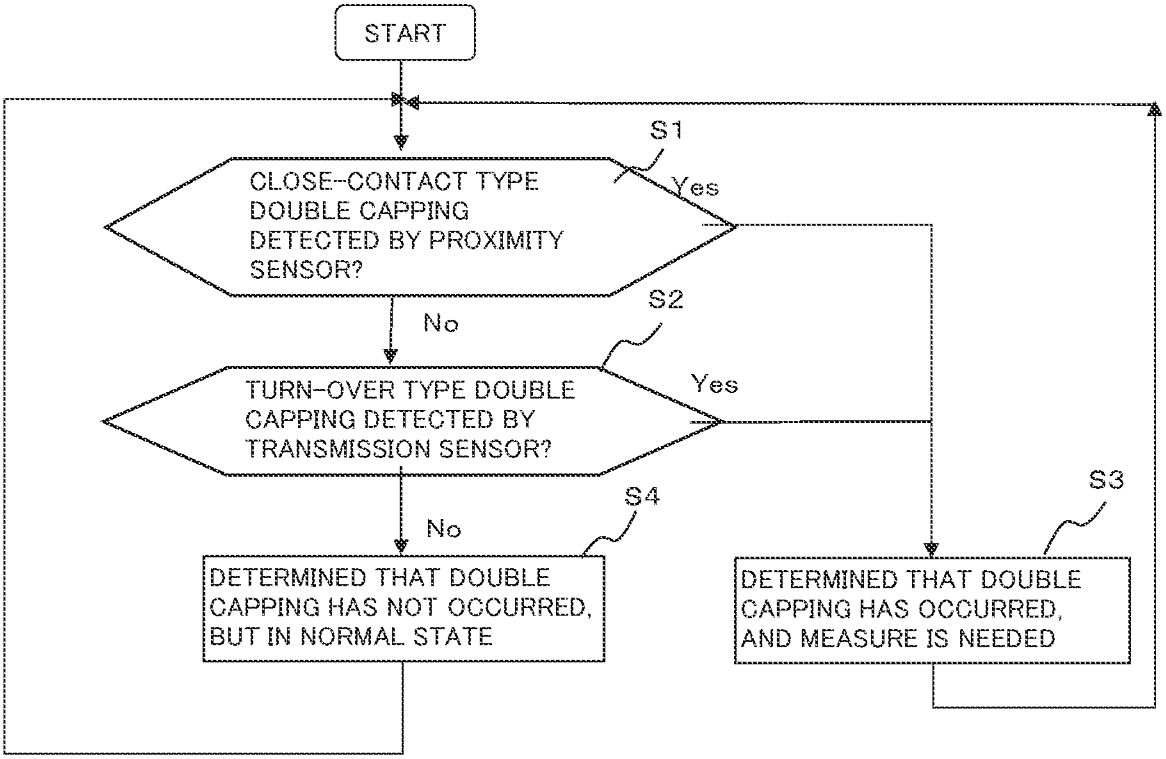
FIG. 11 is a flowchart illustrating a procedure for detecting the double capping in the embodiment.

In FIG. 11, at Step S1, it is determined whether the double capping (the close-contact type double capping in FIG. 7) in which the subsequent cap 2-1 closely contacts with the outer surface of the moving container 1 (FIG. 2) has been detected by the proximity sensor 3 (FIG. 2, FIG. 3) or not.

If the cap 2 (subsequent cap 2-1) is detected in the inspection region RI1 (refer to FIG. 3: the region RI1 in which the cap 2 is not present in the normal state) of the proximity sensor 3, it is determined that the close-contact type double capping has occurred (has been detected) in the container 1 ("Yes" at Step S1), while if the cap 2 is not detected in the inspection region RI1, it is determined that the close-contact type double capping has not occurred (not detected) in the container 1, and the close-contact type double capping has not occurred ("No" at Step S1).

If the close-contact type double capping is detected ("Yes" at Step S1), the control processing proceeds to Step S3, while if the close-contact type double capping is not detected ("No" at Step S1), the control processing proceeds to Step S2.

At Step S2 (in the case that the close-contact type double capping is not detected), it is determined by means of the transmission sensor 4 (FIGS. 2 and 9) whether the double capping (the turn-over type double capping shown in FIG. 8: FIG. 8) is detected on the outer surface of the container 1 moving on the path or not.

If the cap 2 (the subsequent cap 2-1 being separated from the container surface and turned over) is detected by the transmission sensor 4 in the inspection region RI2 (FIG. 9: the region where the cap 2 is not present in the normal state), it is determined that the turn-over type double capping has occurred (detected) in the container 1 ("Yes" at Step S2), while if the cap 2 is not detected in the inspection region RI2, it is determined that the turn-over type double capping has not occurred (not detected), and the turn-over type double capping has not occurred ("No" at Step S2).

As the result of the determination in Step S2, if the turn-over type double capping is detected ("Yes" at Step S2), the control processing proceeds to Step S3, while if the turn-over type double capping is not detected ("No" at Step S2), the control processing proceeds to Step S4.

At Step S3 (in the case that the close-contact type double capping or the turn-over type double capping is detected), it is determined that the double capping has occurred (detected) and processing or a procedure is needed against it.

And the operation and/or procedure are required in the case that the double capping (the close-contact type double capping or the turn-over type double capping) is detected, that is, an operation of an alarm device, temporary stop of an operation of the manufacturing device 100 (FIG. 1), exclusion of the container in which the double capping has occurred, and cause investigation and the procedure against the double capping are carried out.

At Step S4 (in the case that the close-contact type double capping and the turn-over type double capping are not detected), it is determined that the double capping has not occurred, and the state is normal.

When Step S3, Step S4 are finished, the control processing returns to Step S1, and the similar processing is carried out for the subsequent container 1.

Here, in the procedure shown in FIG. 11, Step S1 and Step S2 can be carried out in a reverse order, and Step S1 and Step S2 can be also carried out at the same time.

According to the illustrated embodiment, in the detection device 10, the proximity sensor 3 is provided along the path on which the container 1 moves, and the proximity sensor 3 detects the inspection region RI1 on the container surface where the cap 2 (2-1) is not present in the normal state in which the double capping (close-contact type double capping: FIG. 7) in close contact with the outer surface of the container 1 has not occurred. On the other hand, if the subsequent cap 2-1 is in close contact with the container surface (in the case that the close-contact type double capping in FIG. 7 has occurred), a part of the entrained subsequent cap 2-1 is present in the inspection region RI1. As a result, if the close-contact type double capping has occurred, the proximity sensor 3 detects presence of the subsequent cap 2-1 and can detect occurrence of the close-contact type double capping.

Moreover, in the illustrated embodiment, six units (plural units) of the proximity sensors 3 are provided within an area the outer-peripheral dimension of which is substantially the same as the outer-peripheral dimension of the container 1. Also, six units of the proximity sensor 3 are disposed so that the distance to the adjacent proximity sensor 3 corresponds to the range of the center angle of 60° in the circumferential direction of the container 1, and then, the circumferential direction of the rotating container 1 is inspected at equal intervals. Thus, wherever on the circumference of the container 1 the subsequent cap 2-1 is present in the close-contact type double capping, it can be detected reliably.

Moreover, according to the illustrated embodiment, in the detection device 10A, the transmission sensor 4 is provided along the path on which the container 1 moves, and then, in the case that the turn-over type double capping (FIG. 8) occurs in the container 1, the detection region RI2 in which the cap 2 is not present in the normal state is inspected. Thus, in the case that the subsequent cap 2-1 which was separated from the container outer periphery and turned over upward is present (in the case that the turn-over type double capping has occurred), since the subsequent cap 2-1 turned over upward shields the light or the like (ultrasonic waves or the like emitted in some cases) which is emitted from the irradiation side 4A (projector, for example) of the transmission sensor 4, the reception side 4B (optical receiver, for example) cannot receive the irradiation light or the like.

Therefore, when the container 1 passes through the spot where the transmission sensor 4 is provided, if the emitted light or the like is not detected by the reception side 4B, the subsequent cap 2-1 separated from the container outer periphery and turned over upward shields the light or the like which was emitted and passed through the inspection region RI2 and thus, occurrence of the turn-over type double capping is detected.

Furthermore, in the illustrated embodiment including the detection device 10, 10A, the proximity sensor 3 and the transmission sensor 4 are provided along the path on which the container 1 moves. Therefore, it can be detected reliably, either of the close-contact type double capping of the type in which the subsequent cap 2-1 is in close contact with the container surface as shown in FIG. 7 and the turn-over type double capping of the type in which the subsequent cap 2-1 is separated from the container outer periphery and turned over upwardly as shown in FIG. 8.

Here, the proximity sensor 3 and the transmission sensor 4 are provided in the detection device 10, 10A, respectively, but a camera is not provided, and it is not necessary to photograph the conveyed container after being capped. Thus, it is not necessary for the illustrated embodiment to separately provide a mechanism for installing the camera in the production line.

Moreover, since the proximity sensor 3 and the transmission sensor 4 are far more inexpensive (cheap) as compared with the camera, the entire cost of the production line relating to the embodiment can be reduced as compared with a production line comprising an expensive camera.

In addition, in the illustrated embodiment, since the proximity sensor 3 and/or the transmission sensor 4 are provided in the curling device 20, the close-contact type double capping shown in FIG. 7 can be detected while the skirt portion 2A and the pull-tab 2B of the cap 2 are brought into close contact with the container 1 by rotating the container 1 by means of the belt 21 and the curling plate 22. At the same time, the turn-over type double capping shown in FIG. 8 can be detected substantially at the same time as the detection of the close-contact type double capping.

It should be noted that the illustrated embodiment is merely exemplification, and the descriptions thereof are not intended to limit a technical range of the present invention.

REFERENCE SIGNS LIST

1 Container
1A Opening
2 Cap
3 Proximity sensor
4 Transmission sensor
4A Projector (irradiation-side device)
4B Optical receiver (Reception-side sensor)
20 Curling device
10, 10A Detection device
100 Manufacturing device

The invention claimed is:

1. A double-capping detection device characterized in that on a production line of a product in which an opening of a container is sealed with a cap, wherein:

said production line comprises a curling device comprising a proximity sensor and a curling plate, which plate presses a side part of the cap capping to the container, and a sectional shape of which is constructed so as to gradually change from an upstream of the production line to a downstream thereof, in order that a skirt portion and a pull-tab of the cap are brought into contact with a surface of the container, said opening is formed in a mouth portion which is an uppermost part of the container and is formed in a conical trapezoid shape, in a lower area of said mouth portion, there is an area corresponding to a detection region of a proximity sensor to which the skirt portion and the pull-tab of the cap is not attached in a normal state, in which state a subsequent cap is not entrained by the cap at the time that the cap covers the container, the area corresponding to the detection region is in a surface of the container, the proximity sensor is provided along a path on which the container moves, wherein the proximity sensor is capable of detecting aluminum in the detection region, and the area corresponding to the detection region is an area where aluminum would be present in the case that the cap and the subsequent cap are pressed in close contact with the surface of the container by the curling plate, said case is happened if the subsequent cap is entrained by the cap at the time that the cap covers the container.

2. The double-capping detection device according to claim 1, wherein the proximity sensor is provided in an area where the container rotates in the path on which the container is conveyed.

3. The double-capping detection device according to claim 1, wherein the double capping detection device comprises additional proximity sensors, such that the proximity sensors are provided in plural along the path on which the container is conveyed and the proximity sensors are provided within an area a dimension of which is substantially the same as an outer peripheral dimension of the container.

4. A double-capping detection device characterized in that on a production line of a product in which an opening of a container is sealed with a cap, wherein:

said production line comprises a curling device comprising a transmission sensor including a transmitter and a receiver and a curling plate, which plate presses a side part of the cap capping to the container, and a sectional shape of which is constructed so as to gradually change from an upstream of the production line to a downstream thereof, in order that a skirt portion and a pull-tab of the cap are brought into contact with a surface of the container, the transmission sensor including the transmitter and the receiver is provided along a path on which the container moves, and is capable to emit an optical light from the transmitter to the receiver through a space being above the container in said path in order to detect a transmission in the space in a normal state, in which state a subsequent cap is not entrained by the cap at the time that the cap covers the container, the space is a space between the transmitter and the receiver and corresponds to a detection region of the sensor in which space an irradiation light is emitted from the transmitter to the receiver, the space is a space in which the cap cannot be present in the normal state, and the space is a space in which aluminum would be present in a case that the cap and the subsequent cap are pressed in close contact by the curling plate to the surface of the container, in this case a part of the subsequent cap is separated from the container surface and is turned over thereby and other part of the subsequent cap is contact with a surface of the container, and in this case the part of the subsequent cap being turned over moves through the space.

5. The double-capping detection device according to claim 4, wherein the sensor is provided in an area where the container rotates in the path on which the container is conveyed or an area downstream of an area for rotating the container.

6. The double-capping detection device according to claim 4, wherein the sensor is a transmission sensor.

7. A double-capping detection device characterized in that on a production line of a product in which an opening of a container is sealed with a cap, wherein:

said production line comprises a curling device comprising a proximity sensor, a transmission sensor including a transmitter and a receiver and a curling plate, which plate presses a side part of the cap capping to the container, and a sectional shape of which is constructed so as to gradually change from an upstream of the production line to an downstream thereof, in order that a skirt portion and a pull-tab of the cap are brought into contact with a surface of the container, said opening is formed in a mouth portion which is an uppermost part of the container and is formed in a conical trapezoid shape, in a lower area of said mouth portion, there is an area corresponding to a detection region of a proximity sensor to which the skirt portion and the pull-tab of the cap is not attached in a normal state, in which state a subsequent cap is not entrained by the cap at the time that the cap covers the container, the area corresponding to the detection region is in a surface of the container, the proximity sensor is provided along a path on which the container moves, wherein the proximity sensor is capable of detecting aluminum in the detection region, the area corresponding to the detection region is an area where aluminum would be present in the case that the cap and the subsequent cap are pressed in close contact with the surface of the container by the curling plate, said case is happened if the subsequent cap is entrained by the cap at the time that the cap covers the container, the transmission sensor including the transmitter and the receiver is provided along a path on which the container moves, and is capable to emit an optical light from the transmitter to the receiver through a space being above the container in said path in order to detect a transmission in the space in the normal state, the space is a space between the transmitter and the receiver, and corresponds to a detection region of the sensor in which space an irradiation light is emitted from the transmitter to the receiver, the space is a space in which the cap cannot be present in the normal state, and the space is a space in which aluminum would be present in a case that the cap and a the subsequent cap are pressed in close contact with the by the curling plate to the surface of the container, in this case a part of the subsequent cap is separated from the container surface and is turned over thereby and other part of the subsequent cap is contact with a surface of the container, and in this case the part of the subsequent cap being turned over moves through the space.

8. The double-capping detection device according to claim 7, wherein the proximity sensor is provided in an area where the container rotates in the path on which the container is conveyed.

9. The double-capping detection device according to claim 7, wherein the double-capping detection device comprises additional proximity sensors, such that the proximity sensors are provided in plural along the path on which the container is conveyed and the proximity sensors are provided within an area a dimension of which is substantially the same as an outer peripheral dimension of the container.

10. The double-capping detection device according to claim 7, wherein the first and second sensors are provided in an area where the container rotates in the path on which the container is conveyed or an area after the rotating operation.

11. The double-capping detection device according to claim 7, wherein the second sensor is a transmission sensor.

* * * * *